US012198881B2

(12) United States Patent
Tian et al.

(10) Patent No.: US 12,198,881 B2
(45) Date of Patent: Jan. 14, 2025

(54) CONTACT APPARATUS AND ELECTROMAGNETIC SWITCH

(71) Applicant: Huawei Digital Power Technologies Co., Ltd., Shenzhen (CN)

(72) Inventors: Xiaokang Tian, Shanghai (CN); Taixian Chen, Dongguan (CN); Fugao Zhao, Dongguan (CN); Guangming Huang, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 185 days.

(21) Appl. No.: 17/947,531

(22) Filed: Sep. 19, 2022

(65) Prior Publication Data

US 2023/0012132 A1 Jan. 12, 2023

Related U.S. Application Data

(63) Continuation of application No. PCT/CN2020/080371, filed on Mar. 20, 2020.

(51) Int. Cl.
*H01H 50/62* (2006.01)
*H01H 50/02* (2006.01)
*H01H 50/56* (2006.01)

(52) U.S. Cl.
CPC .......... *H01H 50/62* (2013.01); *H01H 50/026* (2013.01); *H01H 50/56* (2013.01)

(58) Field of Classification Search
CPC ...... H01H 50/62; H01H 50/026; H01H 50/56; H01H 50/023; H01H 1/2008; H01H 50/22; H01H 50/546
See application file for complete search history.

(56) References Cited

U.S. PATENT DOCUMENTS 8,138,872 B2 * 3/2012 Yoshihara .............. H01H 50/36 335/185
8,330,565 B2 * 12/2012 Eum .................... H01H 51/065 335/131
8,395,463 B2 * 3/2013 Ito ............................ H01H 9/34 335/251

(Continued)

FOREIGN PATENT DOCUMENTS

CN 101677044 B 12/2011
CN 105513897 A 4/2016

(Continued)

*Primary Examiner* — Shawki S Ismail
*Assistant Examiner* — Lisa N Homza
(74) *Attorney, Agent, or Firm* — Maier & Maier, PLLC

(57) ABSTRACT

An electromagnetic switch, including a driving apparatus and a contact apparatus. The contact apparatus includes a moving contact assembly, a chamber, and two spaced fixed contacts disposed on a top part of the chamber. The moving contact assembly includes an insulating part, a push rod, a moving contact, and an elastic part. One end of the push rod is mounted on the driving apparatus, and the other end of the push rod is mounted on the insulating part. The moving contact is mounted on one side that is of the insulating part and that is back to the push rod. The elastic part is clamped between the insulating part and the moving contact, so that the moving contact is in contact with or separated from the pair of fixed contacts under the action of the push rod.

13 Claims, 10 Drawing Sheets

(56) References Cited

U.S. PATENT DOCUMENTS

| | | | | |
|---|---|---|---|---|
| 8,653,917 | B2 * | 2/2014 | Takaya | H01H 50/546 335/131 |
| 9,799,474 | B2 | 10/2017 | Sakai et al. | |
| 2002/0145494 | A1 * | 10/2002 | Andoh | H01H 50/443 335/126 |
| 2014/0167892 | A1 * | 6/2014 | Hirabayashi | H01H 51/065 335/203 |
| 2015/0022291 | A1 * | 1/2015 | Kashimura | H01H 9/46 218/148 |
| 2015/0034600 | A1 * | 2/2015 | Isozaki | H01H 1/06 218/148 |

FOREIGN PATENT DOCUMENTS

| | | | |
|---|---|---|---|
| CN | 106057586 | A | 10/2016 |
| CN | 106409608 | A | 2/2017 |
| CN | 105551897 | B | 11/2018 |
| CN | 210110661 | U | 2/2020 |
| EP | 3396693 | A1 | 10/2018 |
| WO | 2020031068 | A1 | 2/2020 |

* cited by examiner

CONTACT APPARATUS AND ELECTROMAGNETIC SWITCH

CROSS-REFERENCE TO RELATED APPLICATIONS

This application is a continuation of International Application No. PCT/CN2020/080371, filed on Mar. 20, 2020, the disclosure of which is hereby incorporated by reference in its entirety.

TECHNICAL FIELD

The embodiments relate to the field of electrical control device technologies, a contact apparatus, and an electromagnetic switch.

BACKGROUND

An electromagnetic switch is an electrical device that can frequently turn on, carry, and turn off a normal current and a specified overload current. An operating principle of the electromagnetic switch is that a current flows through a coil to generate a magnetic field, so that a contact is connected or disconnected, to control a load. The electromagnetic switch usually includes a contactor and a relay.

The coil in the electromagnetic switch is usually energized with a low voltage (for example, 12 V), and the contact is usually energized with a high voltage (for example, 380 V), to control the high voltage by using the low voltage. Usually, an insulator is disposed between the contact and the coil to isolate the high voltage and the low voltage while the high voltage is controlled by using the low voltage. However, for an electromagnetic switch mounted and used in a vehicle, because a coil is further electrically connected to a low-voltage device (for example, an audio and video control device or a USB) that is directly operated by a person in the vehicle, if insulation between a contact and the coil fails, a high voltage of the contact is transmitted to the low-voltage device of the vehicle through the coil, resulting in an electric shock to the person. Therefore, to ensure safety of the person, how to improve an insulation capability between the contact and the coil is an objective pursued by the industry.

SUMMARY

The embodiments may provide a contact apparatus and an electromagnetic switch that can improve an insulation capability between a contact and a coil.

According to a first aspect, an embodiment provides a contact apparatus. The contact apparatus includes: a hollow chamber with an opening disposed on one side, two spaced fixed contacts disposed on a top part of the chamber, and a moving contact assembly disposed inside the chamber, where the top part of the chamber is away from the opening, and the two fixed contacts extend into the chamber. The moving contact assembly includes a plastic insulating part, a push rod, a moving contact, and an elastic part. One end of the push rod is mounted on a driving apparatus, and the other end of the push rod is mounted on the insulating part. The moving contact is mounted on one side that is of the insulating part and that is back to the push rod. The elastic part is clamped between the insulating part and the moving contact, so that the moving contact is in contact with or separated from the pair of fixed contacts under the action of the push rod. A plurality of spaced protrusions is disposed on an outer wall that is of the insulating part and that is located between the moving contact and the push rod.

According to the first aspect, the plastic insulating part is configured to implement insulated isolation between the moving contact and the push rod, to prevent a surge voltage after the moving contact contacts the pair of fixed contacts from being transmitted to a coil. Because a plurality of spaced protrusion structures similar to high-voltage electrical insulators is disposed on the outer wall of the insulating part, a creepage distance on a material surface is increased, and an insulation capability of the insulating part is improved.

According to the first aspect, in a possible implementation, to ensure a maximum creepage distance, the plurality of spaced protrusions is disposed on the outer wall of the insulating part in an axial direction of the push rod. The plurality of protrusions is arranged in a ring or spiral shape in the axial direction of the push rod.

According to the first aspect, in a possible implementation, the insulating part includes a base part, and the moving contact and the push rod are respectively mounted on two opposite sides of the base part; a peripheral edge of the base part protrudes in a direction moving close to the moving contact to form a cylindrical housing surrounding the elastic part; and the plurality of spaced protrusions is disposed around an outer surface of the cylindrical housing. In this way, a height of the insulating part can be decreased while the insulation capability of the insulating part is improved by increasing the creepage distance, thereby reducing a volume of the electromagnetic switch. The height refers to a size of the insulating part in the axial direction of the push rod.

According to the first aspect, in a possible implementation, the insulating part includes a base part, and the moving contact and the push rod are respectively mounted on two opposite sides of the base part; a peripheral edge of the base part protrudes in a direction moving away from the moving contact to form a cylindrical housing surrounding the push rod; and the plurality of spaced protrusions is disposed around an outer surface of the cylindrical housing. Therefore, a case in which a foreign matter intrudes into an insertion hole due to contact and separation between the pair of fixed contacts and the moving contact can be reduced.

According to the first aspect, in a possible implementation, the insulating part includes a base part, and the moving contact and the push rod are respectively mounted on two opposite sides of the base part; and the plurality of spaced protrusions is disposed around an outer wall of the base part. In this way, the insulation capability of the insulating part can be improved by increasing the creepage distance without increasing a height of the insulating part.

According to the first aspect, in a possible implementation, to mount and fasten the moving contact, and ensure a pressure when the moving contact contacts the pair of fixed contacts, the moving contact assembly further includes a mounting rod and a limiting part. A positioning protrusion is disposed on one side that is of the base part and that is close to the moving contact. The elastic part is sleeved on the positioning protrusion and is clamped between the moving contact and the base part. One end of the mounting rod is mounted on the positioning protrusion, and the other end of the mounting rod passes through the moving contact and is buckled with the limiting part to limit the moving contact.

According to the first aspect, in a possible implementation, to ensure synchronization of contact and separation between the moving contact and the pair of fixed contacts, and prolong service life of the contacts, the moving contact assembly further includes a contact guide sleeve. The contact guide sleeve includes a shaft sleeve and a round flange formed after the shaft sleeve protrudes, in a radial direction, from one end of an axial direction of the shaft sleeve. The shaft sleeve is sleeved between the mounting rod and the moving contact. The flange is located between the moving contact and the limiting part, and an area of the flange is greater than an area of the limiting part.

According to the first aspect, in a possible implementation, to mount and fasten the moving contact, and ensure a pressure when the moving contact contacts the pair of fixed contacts, the moving contact assembly further includes a U-shaped bracket. A positioning protrusion is disposed on one side that is of the base part and that is close to the moving contact. The elastic part is sleeved on the positioning protrusion and is clamped between the moving contact and the base part. The U-shaped bracket crosses the moving contact and is connected to the cylindrical housing or the base part.

According to the first aspect, in a possible implementation, to ensure stability of the mounting rod, an end part that is of the shaft sleeve and that is away from the flange abuts against the positioning protrusion.

According to the first aspect, in a possible implementation, a round through hole is disposed at a middle part of a top part of the U-shaped bracket, and a diameter of the through hole is greater than an outer diameter of the elastic part. This can facilitate mounting of the elastic part.

According to a second aspect, an embodiment provides an electromagnetic switch. The electromagnetic switch includes a driving apparatus. The electromagnetic switch further includes the contact apparatus according to the first aspect and any possible implementation of the first aspect. The contact apparatus is disposed on the driving apparatus. The driving apparatus controls opening and closing of the contact apparatus by using an electromagnetic field generated by a coil.

DETAILED DESCRIPTION OF THE EMBODIMENTS

The embodiments may provide an electromagnetic switch and a contact apparatus used in the electromagnetic switch, to implement on/off control of a current, isolation of a high voltage of a power supply, and the like in a new energy vehicle, a battery pack, or another power distribution circuit, thereby ensuring normal operation of a load or preventing an electric shock risk. The following describes the embodiments with reference to accompanying drawings.

Figure 1:
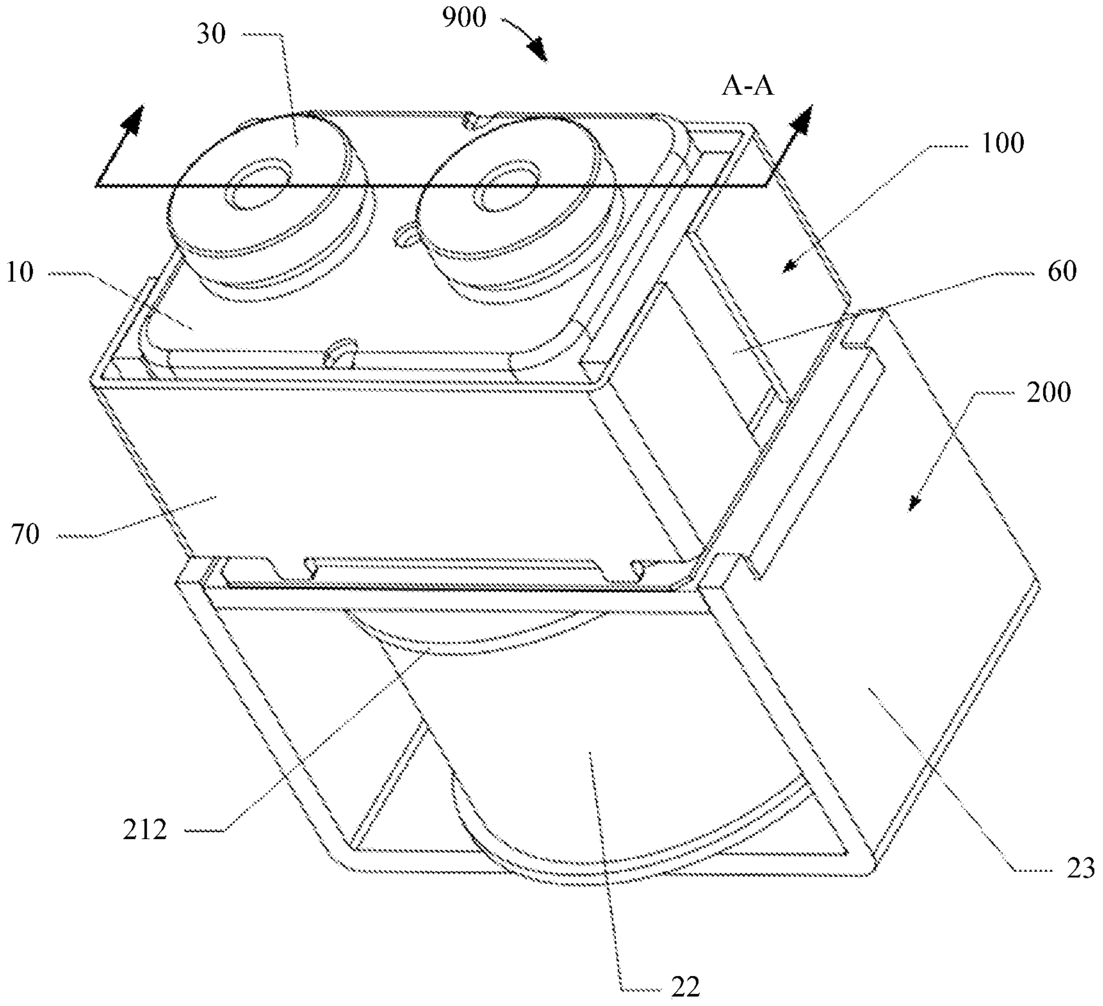
FIG. 1 is a perspective view of an electromagnetic switch according to an embodiment.

FIG. 1 is a perspective view of an electromagnetic switch according to an embodiment. An electromagnetic switch 900 in this embodiment is an electrical device that can frequently turn on, carry, and turn off a normal current and a specified overload current. An operating principle of the electromagnetic switch 900 is that a current flows through a coil to generate a magnetic field, so that a contact is closed, to control a load. The electromagnetic switch usually includes an electromagnetic relay and a contactor. In this embodiment, a direct current contactor is used as an example for description.

The electromagnetic switch 900 includes a driving apparatus 200 and a contact apparatus 100 disposed on the driving apparatus 200. The driving apparatus 200 drives a movable core by using the electromagnetic field generated by the coil to control opening and closing of the contact apparatus 100. The electromagnetic switch 900 in this implementation is a so-called normally open contactor whose contact is disconnected in an initial state. In another implementation, the electromagnetic switch 900 may be alternatively a so-called normally closed contactor whose contact is connected in an initial state.

It may be understood that the electromagnetic switch 900 shown in FIG. 1 usually further includes a housing. For example, the contact apparatus 100 and the driving apparatus 200 are accommodated in a square hollow housing. The housing of the electromagnetic switch 900 in this embodiment is omitted in the schematic diagram.

Figure 2:
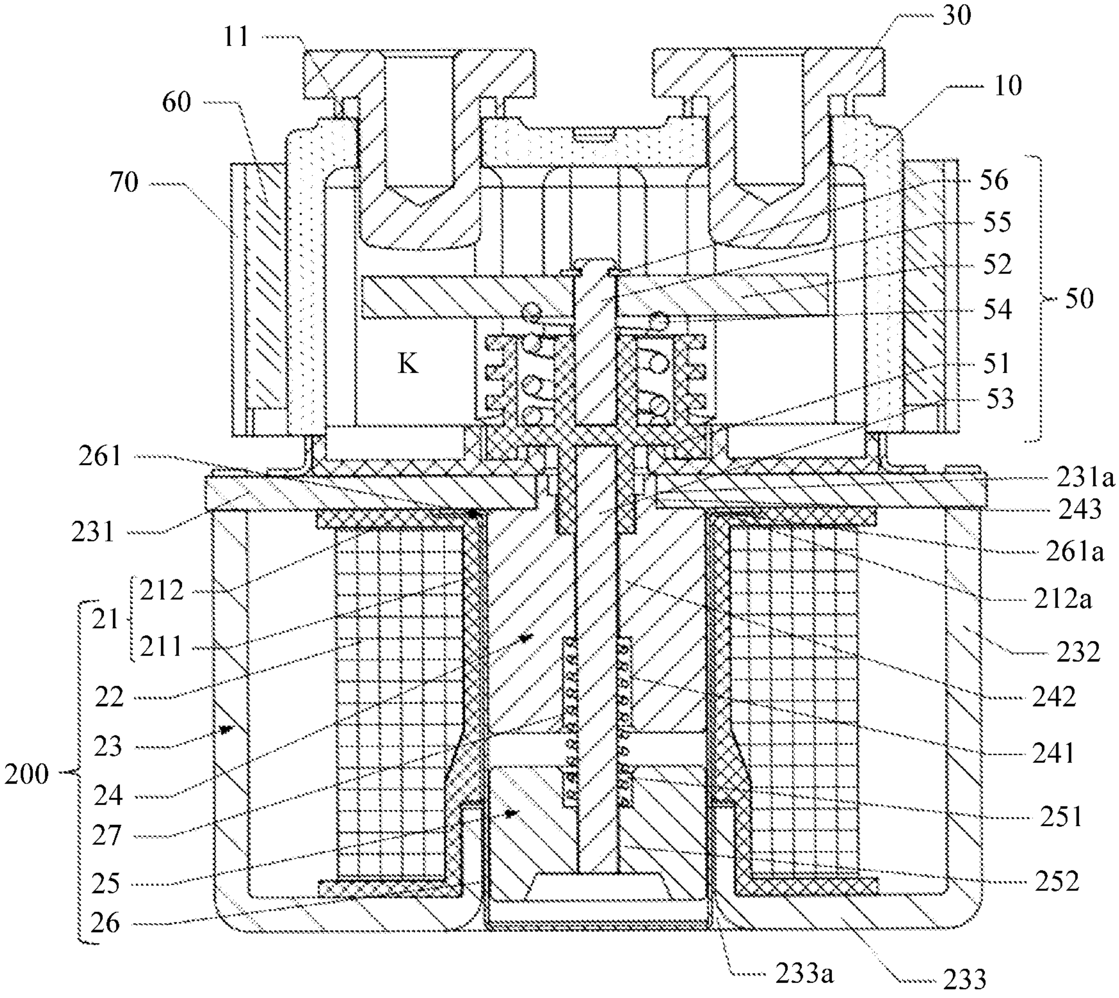
FIG. 2 is a section view of the electromagnetic switch in FIG. 1 in a direction A-A.

FIG. 2 is a section view of the electromagnetic switch in FIG. 1 in a direction A-A. The driving apparatus 200 includes a coil bobbin 21, a coil 22, a yoke 23, a fixed core 24, a movable core 25, a sealing sleeve 26, and a reset spring 27. The coil bobbin 21 may include a hollow cylindrical body part 211, and the body part 211 may protrude, in a radial direction, from two ends of an axial direction of the body part 211 to form round flange parts 212. The axial direction is a direction of a central rotation axis of the cylindrical body, which may be a direction parallel to the central axis. The radial direction is perpendicular to the axial direction, which may be a radius or diameter direction of an end surface circle of the cylindrical body.

The coil 22 is wound on the body part 211 on the coil bobbin 21 and is located between the two flange parts 212 at two ends of the body part 211. It may be understood that two ends of the coil 22 are further connected to coil terminals (not shown in the figure). For example, the coil terminal may be made of a conductive material, for example, copper. In this way, the coil 22 may be energized through the coil terminals to drive the driving apparatus 200.

The yoke 23 is made of a magnetic material and surrounds the coil bobbin 21. In this implementation, the yoke 23 is substantially square, and includes an upper cover plate 231, a pair of side plates 232, and a bottom plate 233 that are successively connected. The upper cover plate 231, the pair of side plates 232, and the bottom plate 233 are all of rectangular plate-like structures, and the upper cover plate 231 and the bottom plate 233 respectively correspond to the two flange parts 212 of the coil bobbin 21. In an implementation, the bottom plate 233 and the pair of side plates 232 may be integrated. For example, the bottom plate 233 and the pair of side plates 232 may be continuously formed by bending a plate.

In addition, a round through insertion hole 233*a* is formed on the bottom plate 233 of the yoke 23, and the sealing sleeve 26 is assembled in the round through insertion hole 233*a*. The round through insertion hole 233*a* may be formed in a stamping manner. In this way, a stamped part of the bottom plate 233 extends into the body part 211 of the coil bobbin 21 to form a peripheral wall of the through insertion hole 233*a*.

The fixed core 24 and the movable core 25 are disposed inside the body part 211 in the axial direction of the body part 211 of the coil bobbin 21. The fixed core 24 is fixedly disposed at one end of the body part 211 and is close to the upper cover plate 231. After the coil 22 is energized, the fixed core 24 generates a suction force due to magnetization, and the movable core 25 can move in a direction moving close to the fixed core 24 under the action of the suction force. In this implementation, both the fixed core 24 and the movable core 25 are substantially cylindrical.

The sealing sleeve 26 is disposed inside the coil bobbin 21 and surrounds the fixed core 24 and the movable core 25. In this implementation, the sealing sleeve 26 is made of a non-magnetic conductive material and has an open end 261. A ring-shaped support surface 212*a* is formed on the flange part 212 that is of the coil bobbin 21 and that is close to the upper cover plate 231, and the open end 261 of the sealing sleeve 26 protrudes in a radial direction to form an abutment part 261*a*. The support surface 212*a* is configured to carry and fasten the abutment part 261*a*, to prevent the sealing sleeve 26 from falling off.

In this embodiment, an outer diameter of the fixed core 24 and an outer diameter of the movable core 25 are substantially the same as an inner diameter of the sealing sleeve 26. The fixed core 24 is disposed on an open side of the sealing sleeve 26, and the movable core 25 moves in the sealing sleeve 26. It may be understood that a moving range of the movable core 25 is a space from an end face that is of the fixed core 24 and that is away from the open end 261 to a bottom of the sealing sleeve 26.

In addition, a plugging hole 231*a* for the fixed core 24 to pass through is disposed at a central part of the upper cover plate 231, and an inner diameter of the plugging hole 231*a* is less than the inner diameter of the sealing sleeve 26. A middle part of one end that is of the fixed core 24 and that is away from the movable core 25 protrudes in an axial direction of the fixed core 24 to form a cylindrical plugging part 243. The plugging part 243 is mounted in the plugging hole 231*a*, to fasten and mount the fixed core 24. It may be understood that a through insertion hole 241 of the fixed core 24 penetrates through the plugging part 243 and is configured to plug the contact apparatus 100.

The reset spring 27 is clamped between the fixed core 24 and the movable core 25. The reset spring 27 is configured to apply, to the movable core 25, a driving force in a direction opposite to a direction of the suction force generated by the fixed core 24, so that when the coil 22 is powered off, the movable core 25 can be driven to return to an initial position, For example, the movable core 25 can be driven to move to a bottom end of the sealing sleeve 26.

It should be noted that in this embodiment, a first abutment part 242 that protrudes toward a central side to reduce a hole diameter of the through insertion hole 241 is disposed on an entire peripheral edge of a central part of the through insertion hole 241 of the fixed core 24. A second abutment part 252 that protrudes toward a central side to reduce a hole diameter of a through insertion hole 251 is disposed on an entire peripheral edge of a bottom of the through insertion hole 251 of the movable core 25. Two ends of the reset spring 27 are respectively abutted between the first abutment part 242 and the second abutment part 252.

The contact apparatus 100 includes a hollow chamber 10, two fixed contacts 30, and a moving contact assembly 50. The chamber 10 is in a box shape with an opening at one end, and one side with the opening is disposed on the upper cover plate 231 of the driving apparatus 200. Two spaced through holes 11 are disposed on a top part that is of the chamber 10 and that is away from the opening, and the two fixed contacts 30 respectively pass through the corresponding through holes 11 to be fastened onto the chamber 10 and extend into the chamber 10. In this embodiment, the chamber 10 is made of a heat-resistant material (for example, ceramic). The fixed contact 30 is substantially cylindrical and is made of a conductive material, for example, a copper-base material.

The moving contact assembly 50 is located inside the chamber 10, and one end of the moving contact assembly 50 is mounted on the driving apparatus 200, so that the moving contact assembly 50 can be in contact with or separated from the two fixed contacts 30 under driving of the driving apparatus 200.

Figure 3:
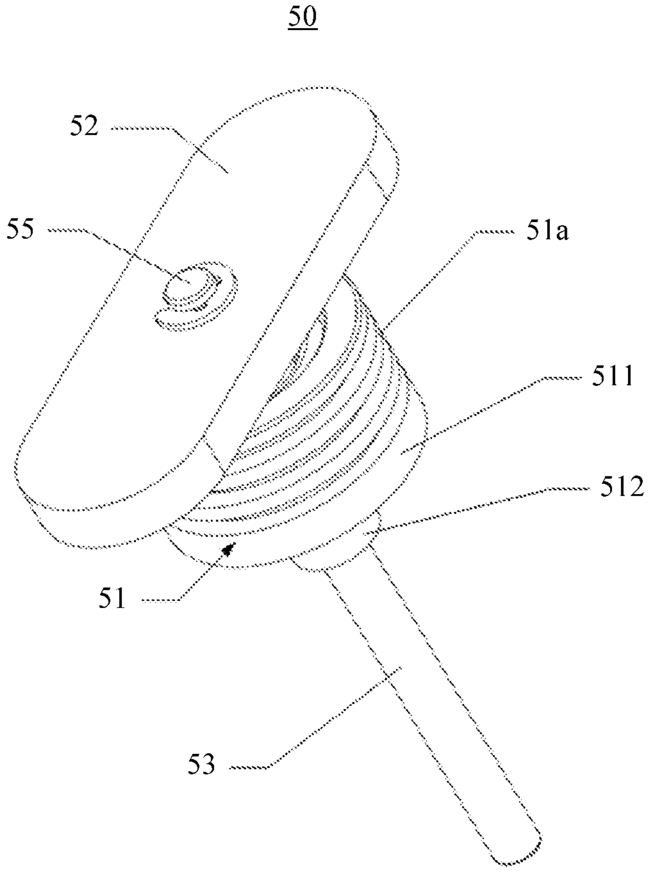
FIG. 3 is a perspective view of a moving contact assembly in FIG. 2.
Figure 4:
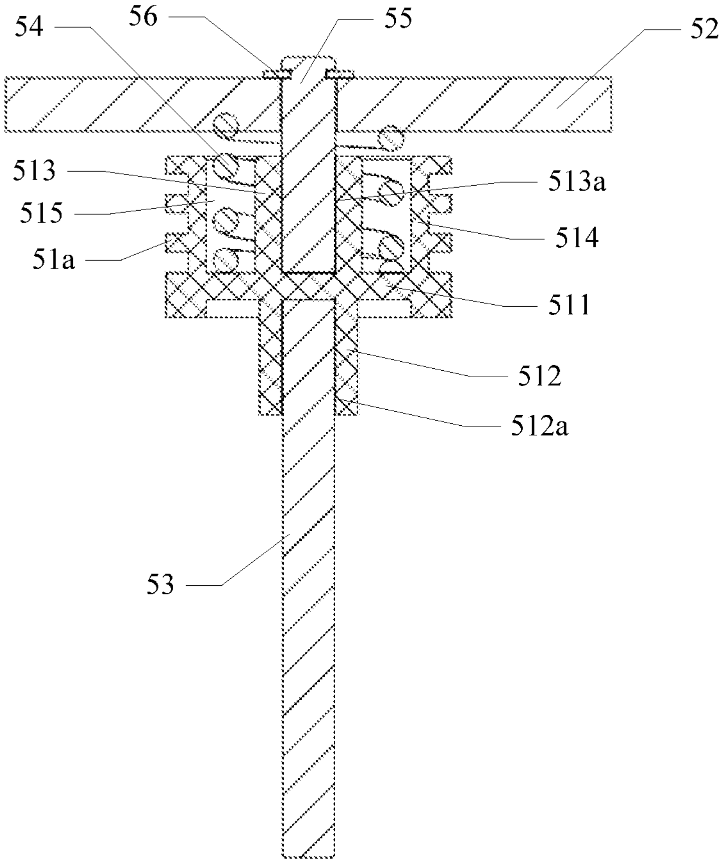
FIG. 4 is a section view of the moving contact assembly in FIG. 3.

FIG. 3 is a perspective view of the moving contact assembly in FIG. 2. FIG. 4 is a section view of the moving contact assembly in FIG. 3. The moving contact assembly 50 may include an insulating part 51, a moving contact 52, a push rod 53, and an elastic part 54. The moving contact 52 and the push rod 53 are respectively mounted on two opposite sides of the insulating part 51. The moving contact 52 is substantially of a long oval plate-like structure and is in contact with or separated from the pair of fixed contacts 30 under the action of the push rod 53.

The push rod 53 is substantially a long round rod. One end (a lower end in FIG. 2) of the push rod 53 is connected to the movable core 25 of the driving apparatus 200, and the other end (an upper end in FIG. 2) of the push rod 53 is connected to the insulating part 51. The push rod 53 is fastened to the movable core 25 after passing through the through insertion hole 241 of the fixed core 24, the reset spring 27, and the through insertion hole 251 of the movable core 25, to push the insulating part 51 to move in the chamber 10 under driving of the movable core 25, thereby implementing contact or separation between the moving contact 52 and the pair of fixed contacts 30.

The insulating part 51 is made of an electrically insulating material, for example, plastic, and is configured to implement insulated isolation between the moving contact 52 and the push rod 53, to prevent a surge voltage after the moving contact 52 contacts the pair of fixed contacts 30 from being transmitted to the coil 22. In this embodiment, a plurality of spaced protrusions 51*a* is disposed on an outer wall that is of the insulating part 51 and that is located between the moving contact 52 and the push rod 53. In this way, the plurality of spaced protrusions 51*a* is disposed on the outer wall of the insulating part 51, to increase a creepage distance. This is equivalent to disposing electrical insulator structures on the outer wall of the insulating part 51, to improve an insulation capability of the insulating part 51, thereby ensuring that the electromagnetic switch 900 does not have an insulation failure when being connected to a high-voltage load for a long time, and the low-voltage coil 22 does not cause a personal injury due to an impact of a high voltage of a contact.

To ensure a maximum creepage distance, the plurality of spaced protrusions 51*a* is disposed on the outer wall of the insulating part 51 in an axial direction of the push rod 53. For example, the plurality of protrusions 51*a* may be arranged in a ring or spiral shape in the axial direction of the push rod 53. In addition, a shape of each protrusion 51*a* is not limited, for example, a cross section of each protrusion 51*a* may be trapezoidal, square, triangular, or semicircular.

In an implementation, to ensure a contact pressure between the moving contact 52 and the two fixed contacts 30, the moving contact 52 is mounted on the insulating part 51 through the elastic part 54. That is, the elastic part 54 is clamped between the insulating part 51 and the moving contact 52. In this implementation, a position relationship between the movable core 25 and the moving contact 52 is set in a manner in which the moving contact 52 is separated from the fixed contacts 30 when the movable core 25 is located at an initial position, and the moving contact 52 is in contact with the fixed contacts 30 when the movable core 25 abuts against the fixed core 24. That is, during a period in which the coil 22 is not energized, the contact apparatus 100 is disconnected, and in this case, the two fixed contacts 30 are disconnected from each other. During a period in which the coil 22 is energized, the contact apparatus 100 is connected, and in this case, the two fixed contacts 30 are connected through the moving contact 52. In this implementation, the elastic part 54 is a coil spring.

In addition, contact over-travel may be further implemented by using the elastic part 54. The contact over-travel refers to a maximum distance that the moving contact 52 can move upward after the fixed contacts 30 are worn.

In an implementation, to fasten and mount the push rod 53 and the elastic part 54, the insulating part 51 includes a base part 511, a mounting part 512, and a positioning protrusion 513, where the mounting part 512 and the positioning protrusion 513 are substantially disposed at central positions on opposite surfaces of the base part 511 and are substantially cylindrical. A mounting hole 512*a* is disposed on the mounting part 512, and one end of the push rod 53 is embedded (for example, riveted) into the mounting hole 512*a*, so that the push rod 53 and the insulating part 51 are fixedly mounted. In another implementation, the push rod 53 may further form an assembly with the insulating part 51 in an injection molding manner. In addition, the positioning protrusion 513 of the insulating part 51 is embedded into the elastic part 54, so that the insulating part 51 is positioned relative to the elastic part 54.

In an implementation, a peripheral edge of the base part 511 protrudes in a direction moving close to the moving contact 52 to form a cylindrical housing 514 surrounding the positioning protrusion 513. The plurality of spaced protrusions 51*a* is disposed around an outer surface of the cylindrical housing 514. The elastic part 54 is sleeved on the positioning protrusion 513 and is located inside the cylindrical housing 514. A groove 515 configured to accommodate a part of the elastic part 54 may be formed between an inner wall of the cylindrical housing 512 and an outer surface of the positioning protrusion 513. In this implementation, because the peripheral edge of the base part 511 protrudes in the direction moving close to the moving contact 52 to form the cylindrical housing 514 surrounding the positioning protrusion 513, a height of the moving contact assembly 50 in the axial direction of the push rod 53 is reduced, a volume of the chamber 10 can be reduced, and a volume (a height) of the electromagnetic switch 900 is reduced.

It may be understood that, in another implementation, the peripheral edge of the base part 511 may alternatively protrude in a direction moving away from the moving contact 52 to form a cylindrical housing 514*a* (refer to FIG. 10) surrounding the mounting part 512, and the protrusions 51*a* may be alternatively disposed on an outer surface of the cylindrical housing 514*a*. This is not limited herein. In this embodiment, a case in which a foreign matter intrudes into the plugging hole 231*a* due to contact and separation between the pair of fixed contacts 30 and the moving contact 52 can be further reduced by using the cylindrical housing 514*a*.

In addition, a shape of a barrel enclosed by the cylindrical housing 514 is not limited, and the barrel may be a round barrel or a square barrel.

To facilitate mounting and fastening of the moving contact 52, the moving contact assembly 50 further includes a mounting rod 55 and a limiting part 56. A positioning hole 513*a* is disposed on the positioning protrusion 513. The mounting rod 55 is substantially a round rod, one end of the mounting rod 55 is embedded into the positioning hole 513*a*, and the other end of the mounting rod 55 passes through the moving contact 52 and extends out of the moving contact 52. The limiting part 56 is buckled with the end that is of the mounting rod 55 and that extends out of the moving contact 52, to prevent the moving contact 52 from falling off the mounting rod 55. In this implementation, the limiting part 56 is a snap spring.

During assembly, the elastic part 54 is first placed in the groove 515, and then the moving contact 52 is mounted on one end of the mounting rod 55. Then, the other end of the mounting rod 55 is inserted into the positioning hole 513*a*. Then, the moving contact 52 is pressed down by using tooling, and a slot at a top part of the mounting rod 55 is exposed. Finally, the limiting part 56 is mounted for limiting.

Figure 5:
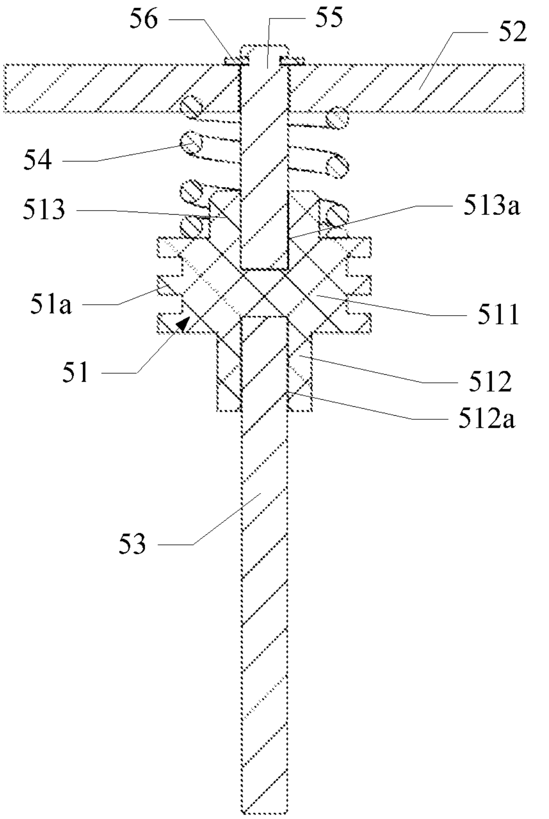
FIG. 5 is a section view of a moving contact assembly according to a second embodiment.

FIG. 5 is a section view of a moving contact assembly according to a second embodiment. Compared with the moving contact assembly 50 in FIG. 4, a difference lies in that the peripheral edge of the base part 511 of the insulating part 51 does not protrude in a direction moving close to or away from the moving contact 52 to form a cylindrical housing. In this embodiment, the spaced protrusions 51*a* are disposed around an outer wall of the base part 511. In this way, a thickness of the base part 511 needs to be increased to set as many protrusions 51*a* as possible, to improve an insulation capability of the electromagnetic switch 900.

However, a larger quantity of protrusions 51*a* does not lead to a stronger insulation capability of the insulating part 51. In the foregoing embodiments, a distance between adjacent protrusions 51*a* may be based on an actual use case. In an implementation, a distance between adjacent protrusions 51*a* in the axial direction of the push rod 53 is greater than a preset threshold, and the preset threshold is related to a pollution level of an environment in which the insulating part 51 is located. For example, if the pollution level of the environment in which the insulating part 51 is located is a level 2, the distance between adjacent protrusions 51*a* needs to be greater than 1 mm Otherwise, a voltage of the moving contact 52 breaks down air transmission between the adjacent protrusions 51*a*, so that a creepage distance of the insulating part 51 on which the protrusions 51*a* are disposed is the same as a creepage distance of an insulating part on which the protrusions 51*a* are not disposed. That is, if the distance between adjacent protrusions 51*a* is excessively small, although the protrusions 51*a* are disposed, the creepage distance is not increased, and the insulation capability of the insulating part 51 is not improved.

There may be four micro environment pollution levels used to determine an electric clearance or a creepage distance. A pollution level 1 means that there is no pollution or only dry non-conductive pollution; a pollution level 2 means that there is only non-conductive pollution in general, but temporary conductive pollution caused by accidental condensation need to be considered; a pollution level 3 means that there is conductive pollution, or there is conductive pollution changed from dry non-conductive pollution through expected condensation; and a pollution level 4 means that persistent conductive pollution is caused, for example, pollution caused by conductive dust or rain and snow.

In the foregoing embodiments, a position of the moving contact 52 is limited by the limiting part 56 on the top part of the mounting rod 55, and the moving contact 52 is in close contact with the limiting part 56 under driving of an elastic force of the elastic part 54. However, because an area of the limiting part 56 is small, heights of two sides of the moving contact 52 may be different. This causes asynchronization to connection and disconnection between the moving contact 52 and the two fixed contacts 30 and affects electrical service life of the contacts.

Figure 6:
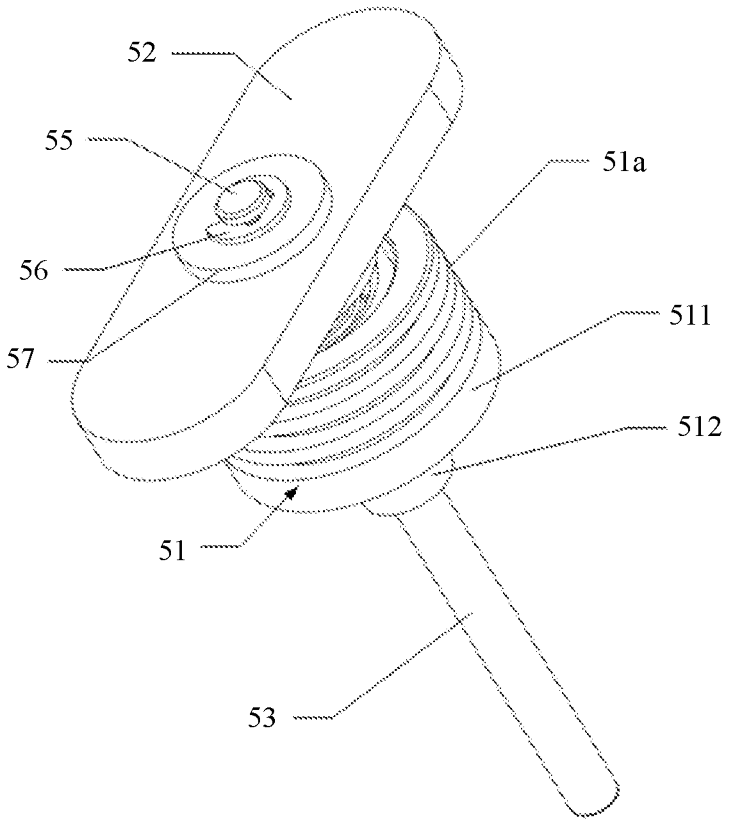
FIG. 6 is a perspective view of a moving contact assembly according to a third embodiment.
Figure 7:
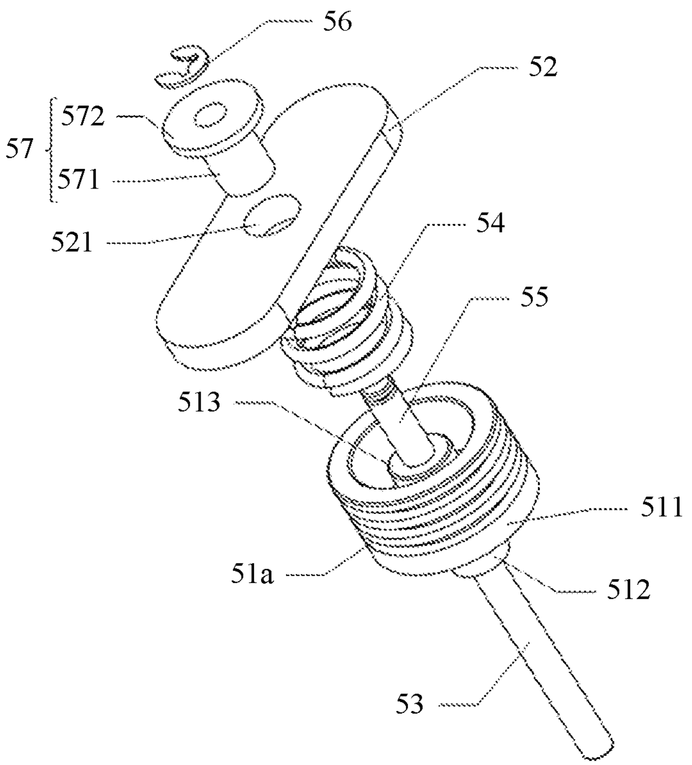
FIG. 7 is a perspective exploded view of the moving contact assembly in FIG. 6.
Figure 8:
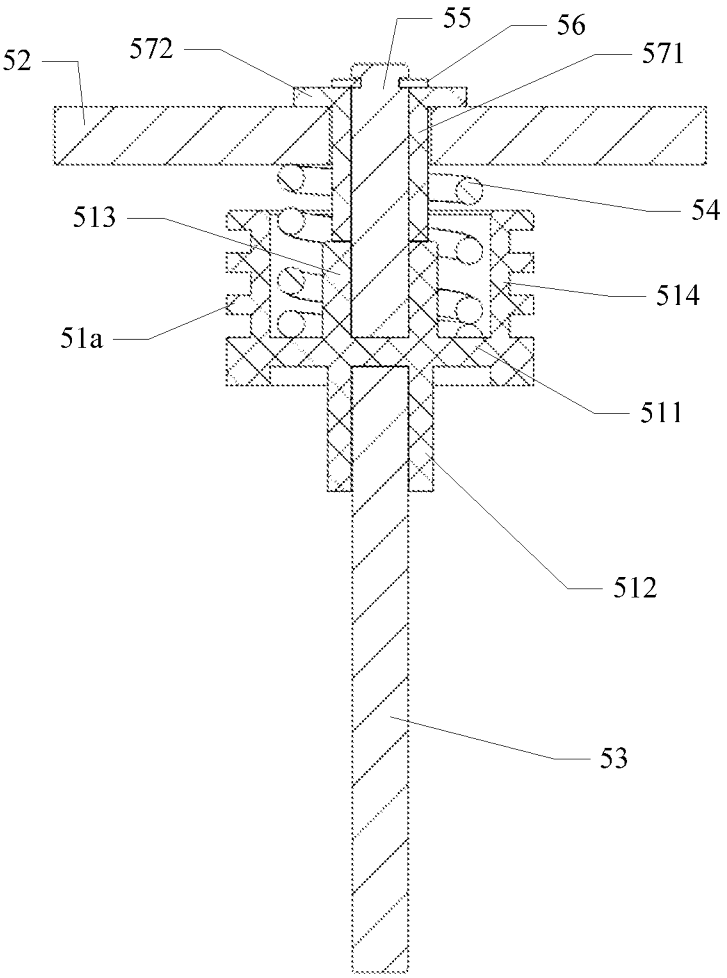
FIG. 8 is a section view of the moving contact assembly in FIG. 6.

FIG. 6 is a perspective view of a moving contact assembly according to a third embodiment; FIG. 7 is a perspective exploded view of the moving contact assembly in FIG. 6; and FIG. 8 is a section view of the moving contact assembly in FIG. 6. As shown in FIG. 6 to FIG. 8, different from the moving contact assembly 50 in FIG. 4, the moving contact assembly 50 in this embodiment further includes a contact guide sleeve 57. The contact guide sleeve 57 includes a shaft sleeve 571 and a round flange 572 formed after the shaft sleeve 571 protrudes, in a radial direction, from one end of an axial direction of the shaft sleeve 571. The shaft sleeve 571 is sleeved outside the mounting rod 55 and is located inside a through hole 521 of the moving contact 52. The flange 572 is located between the moving contact 52 and the limiting part 56, and an area of the flange 572 is greater than that of the limiting part 56. In this way, because the area of the flange 572 is large, an upper surface of the moving contact 52 and a lower surface of the flange 572 are in close contact with each other under driving of the elastic force of the elastic part 54. This can ensure consistent heights of the two sides of the moving contact 52, ensure synchronization of connection and disconnection between the moving contact 52 and the two fixed contacts 30, and improve the electrical service life of the contacts.

In addition, to ensure stability of the mounting rod 55, an end part that is of the shaft sleeve 571 and that is away from the flange 572 abuts against the positioning protrusion 513.

Figure 9:
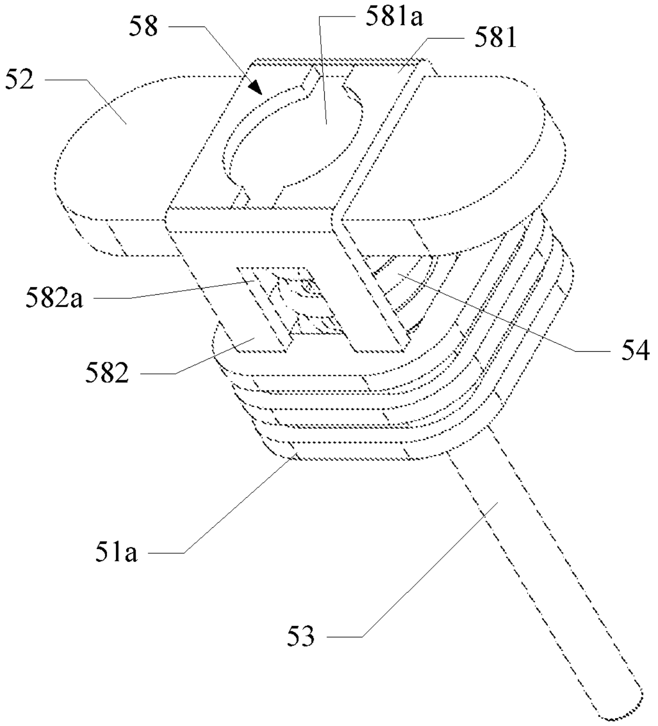
FIG. 9 is a perspective view of a moving contact assembly according to a fourth embodiment.
Figure 10:
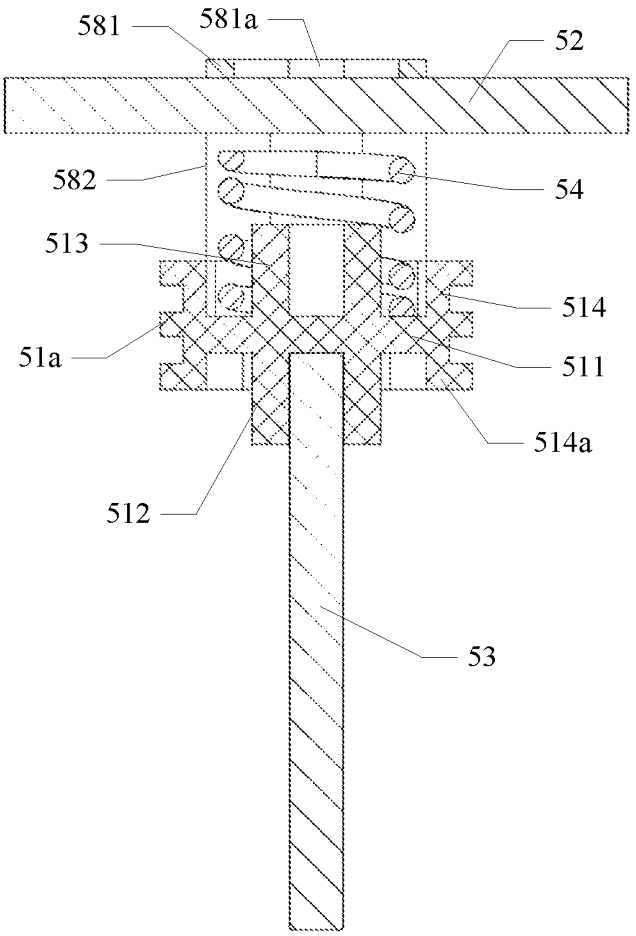
FIG. 10 is a section view of the moving contact assembly in FIG. 9.

FIG. 9 is a perspective view of a moving contact assembly according to a fourth embodiment; and FIG. 10 is a section view of the moving contact assembly in FIG. 9. Different from the moving contact assembly in FIG. 4, the moving contact 52 in this embodiment is fixedly mounted with the insulating part 51 through a U-shaped bracket 58 instead of the mounting rod 55. As shown in FIG. 9 and FIG. 10, two ends of the U-shaped bracket 58 may be fixedly mounted on the insulating part 51, to enclose a frame with the insulating part 51. The moving contact 52 and the elastic part 54 are mounted in the frame enclosed by the U-shaped bracket 58 and the insulating part 51. In this way, the moving contact 52 can be limited and fastened by using the U-shaped bracket 58.

In some implementations, a round through hole 581*a* is disposed at a middle part of a top part 581 of the bracket 58, and a diameter of the through hole 581*a* is greater than an outer diameter of the elastic part 54. During assembly, the U-shaped bracket 58 and the insulating part 51 first form an assembly in an injection molding manner, then the elastic part 54 is placed in the insulating part 51 through the through hole 581*a*, then the elastic part 54 is pressed down by using tooling, and then the moving contact 52 is inserted into the U-shaped bracket 58.

In some implementations, an opening 582*a* is disposed on each of side parts 582 on two opposite sides of the U-shaped bracket 58, to reduce a weight of the U-shaped bracket 58.

As shown in FIG. 1 and FIG. 2, in some implementations, when the moving contact 52 is pulled away from the fixed contacts 30, to inhibit an electric arc between the moving contact 52 and the fixed contacts 30, gas may be sealed into the chamber 10. In this way, a sealed space K sealed with gas is formed in the chamber 10. The gas may be mixed gas, including hydrogen, where the hydrogen has the best thermal conductivity in a temperature region in which the electric arc is generated.

It should be noted that in this implementation, the sealing sleeve 26, the upper cover plate 231, and the chamber 10 form an independent sealed chamber.

In some other implementations, a magnetic apparatus may be further disposed at an outer part of the chamber 10 to assist in blasting. Permanent magnets 60 and magnetic members 70 may be respectively disposed on two opposite sides of the chamber 10. The magnetic member 70 is made of a magnetic material, for example, iron, and is substantially made into a U shape. In this way, the pair of permanent magnets 60 can form a magnetic field substantially orthogonal to a contact and separation direction of the moving contact 52 relative to the fixed contacts 30, so that a generated electric arc is elongated in a direction orthogonal to a moving direction of the moving contact 52. In addition, the gas sealed in the chamber 10 is cooled, so that a voltage of the electric arc rapidly increases, and the electric arc is cut off when the voltage of the electric arc exceeds a power supply voltage. That is, in the electromagnetic switch 900 in this implementation, the electric arc is elongated by using the magnetic field generated by the magnets and is finally extinguished by a cooling effect of the gas sealed in the chamber 10. In this way, the electric arc can be cut off in a short time, and consumption of the fixed contacts 30 and the moving contact 51 can be reduced.

The foregoing are implementations of the embodiments. It should be noted that a person of ordinary skill in the art may further make some improvements and ornaments without departing from the scope of the embodiments.

What is claimed is:

1. A contact apparatus, comprising:

a hollow chamber with an opening disposed on one side;

two spaced fixed contacts disposed on a top part of the chamber; and a moving contact assembly disposed inside the chamber, wherein the top part of the chamber is away from the opening, and the two fixed contacts extend into the chamber; and the moving contact assembly further comprises:

an insulating part made of plastic;

a push rod, wherein one end of the push rod is mounted on a driving apparatus, and the other end of the push rod is mounted on the insulating part;

a moving contact mounted on one side that is of the insulating part and that is back to the push rod; and an elastic part clamped between the insulating part and the moving contact, so that the moving contact is in contact with or separated from the two fixed contacts under the action of the push rod, wherein a plurality of spaced protrusions is disposed on an outer wall that is of the insulating part in an axial direction of the push rod and that is located between the moving contact and the push rod.

2. The contact apparatus according to claim 1, wherein the plurality of protrusions is arranged in a ring or spiral shape in the axial direction of the push rod.

3. The contact apparatus according to claim 1, wherein the insulating part comprises:

a base part, the moving contact and the push rod are respectively mounted on two opposite sides of the base part, a peripheral edge of the base part protrudes in a direction moving close to the moving contact to form a cylindrical housing surrounding the elastic part, and the plurality of spaced protrusions is disposed around an outer surface of the cylindrical housing.

4. The contact apparatus according to claim 3, wherein the moving contact assembly further comprises:

a mounting rod; and a limiting part, a positioning protrusion is disposed on one side that is of the base part and that is close to the moving contact, the elastic part is sleeved on the positioning protrusion, and is clamped between the moving contact and the base part, one end of the mounting rod is mounted on the positioning protrusion, and the other end of the mounting rod passes through the moving contact and is buckled with the limiting part to limit the moving contact.

5. The contact apparatus according to claim 4, wherein the moving contact assembly further comprises:

a contact guide sleeve, the contact guide sleeve comprises a shaft sleeve and a round flange formed after the shaft sleeve protrudes, in a radial direction, from one end of an axial direction of the shaft sleeve, the shaft sleeve is sleeved between the mounting rod and the moving contact, the flange is located between the moving contact and the limiting part, and an area of the flange is greater than an area of the limiting part.

6. The contact apparatus according to claim 3, wherein the moving contact assembly further comprises a U-shaped bracket, a positioning protrusion is disposed on one side that is of the base part and that is close to the moving contact, the elastic part is sleeved on the positioning protrusion and is clamped between the moving contact and the base part, the U-shaped bracket crosses the moving contact, and an end part of the U-shaped bracket is connected to the base part or the cylindrical housing.

7. The contact apparatus according to claim 1, wherein the insulating part comprises:

a base part, the moving contact and the push rod are respectively mounted on two opposite sides of the base part, a peripheral edge of the base part protrudes in a direction moving away from the moving contact to form a cylindrical housing surrounding the push rod, and the plurality of spaced protrusions is disposed around an outer surface of the cylindrical housing.

8. The contact apparatus according to claim 1, wherein the insulating part comprises:

a base part, the moving contact and the push rod are respectively mounted on two opposite sides of the base part and the plurality of spaced protrusions is disposed around an outer wall of the base part.

9. An electromagnetic switch, comprising a driving apparatus; and a contact apparatus, wherein the contact apparatus further comprises:

a hollow chamber with an opening disposed on one side, two fixed contacts disposed on a top part of the chamber, and a moving contact assembly disposed inside the chamber, wherein the top part of the chamber is away from the opening, the two fixed contacts extend into the chamber; and the moving contact assembly further comprises:

an insulating part, made of plastic;

a push rod, wherein one end of the push rod is mounted on a driving apparatus, and the other end of the push rod is mounted on the insulating part;

a moving contact, mounted on one side that is of the insulating part and that is back to the push rod; and an elastic part, clamped between the insulating part and the moving contact, so that the moving contact is in contact with or separated from the two fixed contacts under the action of the push rod, wherein a plurality of spaced protrusions is disposed on an outer wall that is of the insulating part in an axial direction of the push rod and that is located between the moving contact and the push rod, the contact apparatus is disposed on the driving apparatus; and the driving apparatus controls opening and closing of the contact apparatus by using an electromagnetic field generated by a coil.

10. The electromagnetic switch according to claim 9, wherein the plurality of protrusions is arranged in a ring or spiral shape in the axial direction of the push rod.

11. The electromagnetic switch according to claim 9, wherein the insulating part comprises a base part, the moving contact and the push rod are respectively mounted on two opposite sides of the base part, a peripheral edge of the base part protrudes in a direction moving close to the moving contact to form a cylindrical housing surrounding the elastic part, and the plurality of spaced protrusions is disposed around an outer surface of the cylindrical housing.

12. The electromagnetic switch according to claim 9, wherein the insulating part comprises a base part, the moving contact and the push rod are respectively mounted on two opposite sides of the base part, a peripheral edge of the base part protrudes in a direction moving away from the moving contact to form a cylindrical housing surrounding the push rod, and the plurality of spaced protrusions is disposed around an outer surface of the cylindrical housing.

13. The electromagnetic switch according to claim 9, wherein the insulating part comprises a base part, the moving contact and the push rod are respectively mounted on two opposite sides of the base part, and the plurality of spaced protrusions is disposed around an outer wall of the base part.

* * * * *